United States Patent [19]

Sato

[11] Patent Number: 5,800,055

[45] Date of Patent: Sep. 1, 1998

[54] TEMPERATURE CONTROL SYSTEM AND KNEADING-MIXING EXTRUSION APPARATUS HAVING THE TEMPERATURE CONTROL SYSTEM

[75] Inventor: Takuya Sato, Suita, Japan

[73] Assignee: Sato Iron Works Co., Ltd., Osaka, Japan

[21] Appl. No.: 809,321

[22] PCT Filed: Jul. 20, 1995

[86] PCT No.: PCT/JP95/01465

§ 371 Date: Mar. 19, 1997

§ 102(e) Date: Mar. 19, 1997

[87] PCT Pub. No.: WO97/03804

PCT Pub. Date: Feb. 6, 1997

[51] Int. Cl.[6] .............................. B29B 7/46; B29B 7/82; B29B 7/84

[52] U.S. Cl. ...................... 366/75; 366/76.3; 366/82; 366/145; 366/147; 366/149; 366/158.1; 366/307; 425/199; 425/203; 425/378.1

[58] Field of Search ................... 366/75, 76.3, 76.4, 366/76.6, 79–85, 88–91, 145, 147, 149, 156.1, 158.1, 158.2, 158.3, 307, 319, 322, 323; 425/203, 204, 208, 209, 378.1, 199, 205

[56] References Cited

U.S. PATENT DOCUMENTS

| | | |
|---|---|---|
| 2,524,999 | 10/1950 | Schulerud . |
| 2,640,033 | 5/1953 | Marshall . |
| 3,609,828 | 10/1971 | Compa et al. . |
| 3,946,803 | 3/1976 | Heitzer et al. ................ 366/145 X |
| 4,067,553 | 1/1978 | Yamaoka ................ 366/82 |
| 4,090,829 | 5/1978 | Fischer et al. . |
| 4,127,372 | 11/1978 | Perla et al. ................ 425/205 X |
| 4,197,070 | 4/1980 | Koschmann ................ 366/145 X |
| 4,222,729 | 9/1980 | Ragazzini et al. . |
| 4,408,887 | 10/1983 | Yamaoka ................ 366/82 X |
| 5,055,027 | 10/1991 | Sato ................ 366/82 X |
| 5,370,456 | 12/1994 | Yamaoka ................ 366/82 X |

FOREIGN PATENT DOCUMENTS

| | | |
|---|---|---|
| 2233927 | 1/1991 | United Kingdom . |
| 8202004 | 6/1982 | WIPO . |

*Primary Examiner*—Charles E. Cooley
*Attorney, Agent, or Firm*—Felfe & Lynch

[57] ABSTRACT

Disclosed is a temperature control system and a kneading-mixing extruder apparatus implementing the temperature control system. The temperature control system includes a flow passage formed in a stationary disc having a plurality of holes provided in a kneading mechanism of the extruder apparatus, a fluid supply device for supplying temperature-adjusted fluid into the flow passage and a temperature control device for setting the temperature of the stationary disc to a desired target temperature.

6 Claims, 9 Drawing Sheets

TEMPERATURE CONTROL SYSTEM AND KNEADING-MIXING EXTRUSION APPARATUS HAVING THE TEMPERATURE CONTROL SYSTEM

TECHNICAL FIELD

The present invention relates to a temperature control system for use in a kneading-mixing extruder apparatus for kneading and mixing chemical material such as soap chips, various kinds of oils and fats or the like and then extruding the material into a predetermined shape, and the invention relates also to such kneading-mixing extruder apparatus having the temperature control system.

BACKGROUND ART

It is well-known, in the manufacturing process of such product as soap, that the temperature of its raw material (material to be processed) such as soap chips significantly affects the workability of this raw material as well as the quality of the end product made from the material. In particular, it has been desired that the manufacture be effected under an optimum temperature condition through appropriate adjustment of heat generated from friction associated with compression and kneading/mixing of the raw soap material in the course of a kneading/mixing step. For implementing such temperature control, in the case of the conventional kneading-mixing extruder apparatus, a water passage is coaxially provided around the outer periphery of a cylinder incorporating an extruder screw. With supply of cooling water to the water passage, the raw material kneaded, mixed and transported by the extruder screw is cooled through heat exchange (heat conduction) with an inner surface of the cooled cylinder, thereby to prevent the temperature of the raw material from rising over a predetermined level.

Indeed, with the use of the conventional temperature control system described above, the over-heating of the raw material may be restricted to some extent, in comparison with the convention not using such system. In practice, however, the cooling effect is limited to the portion of the kneaded and transported material which contacts with the inner peripheral surface of the cylinder, and the remaining material portion kneaded/mixed and transported in the vicinity of the center of the cylinder is not directly cooled. And, this material portion may be cooled only indirectly through its contact with the material portion directly contacting the cylinder surface. Observed along the cross section of the cylinder, the material portion adjacent the inner peripheral surface of the cylinder may be maintained at a relatively low temperature due to the effect of cooling water, whereas, the other material portion remains un-cooled to be left at a high temperature. This temperature irregularity of the raw material in the radial direction of the cylinder leads to disadvantageous quality irregularity of the end product.

Further, some kinds of soap need to be manufactured at a constant temperature of 40°–45° C. which is higher than the room temperature. In this case, contrary to the above case, it is necessary to maintain the material at an elevated temperature during the manufacture. Thus, in place of the cooling water, the water passage disposed about the outer periphery of the cylinder is supplied with warming water maintained at a predetermined elevated temperature in order to maintain the material at this elevated temperature. In this case too, however, the temperature elevating effect is limited to the portion of the material located adjacent the inner peripheral surface of the cylinder, while the remaining material portion located in the vicinity of the screw remains un-heated to be let at a lower temperature.

The present invention attends to the above-described state of the art, and its primary object is to provide a temperature control system for restricting temperature irregularity, in the radial direction of the cylinder, of a raw material present at a predetermined axial position of the cylinder and to provide a kneading-mixing extruder apparatus having this temperature control system.

DISCLOSURE OF THE INVENTION

For accomplishing the above-noted object, a temperature control system, according to the present invention, comprises:

a stationary disc including a flow passage extending from vicinity of a center through to vicinity of a periphery thereof and defining an inlet opening and an output opening for the flow passage;

fluid supply means communicated with said inlet and outlet openings for supplying fluid in circulation; and temperature control means for controlling temperature of said stationary disc;

wherein said stationary disc further defines a plurality of holes which extend through the disc in the thickness thereof and which remain free from communication with said flow passage.

A kneading-mixing extruder apparatus using the above temperature control system, comprises:

a receiver tank for receiving raw material;

a cylinder incorporating a screw for extruding and transporting the material within the cylinder;

a kneading-mixing mechanism disposed along the length of the cylinder for kneading and mixing the material; and a molding mechanism disposed along the length of the cylinder for molding the material;

said kneading-mixing mechanism including a rotary disc rotatable with said screw and a stationary disc fixed to the cylinder, the rotary disc and stationary disc being disposed side by side in an axial direction of the cylinder;

said stationary disc including a flow passage extending from vicinity of a center through to vicinity of a periphery thereof and defining an inlet opening and an output opening for the flow passage; and a temperature control system including fluid supply means communicated with said inlet and outlet openings for supplying fluid in circulation, and temperature control means for controlling temperature of said stationary disc.

With the above construction, when the raw material passes through the rotary disc and the stationary disc, the material is subjected to compressing, dicing and shearing actions from the discs, so that the temperature of the material rises most conspicuously at this stage. Yet, at this very stage, the temperature of the material may be adjusted to an appropriate value by the temperature control system of the present invention. That is, when the material is caused to pass through the plural holes of the stationary disc to be extruded therefrom, a heat exchange takes place from the inner periphery through to the center of the cylinder due to the temperature difference between the stationary disc and the material. Hence, the temperature control may be effected much more efficiently than the conventional apparatus.

Consequently, according to the above construction, since the heat exchange takes place when the material comes into contact with inner peripheral faces of the plurality of holes of the stationary disc, this heat exchange takes place in substantially uniform manner on the material whether the material is present adjacent the outer periphery or inner periphery of the stationary disc. As a result, the construction of the present invention has solved the problem of the prior art of the local concentration of the heat exchange at the portion of the material transported in the vicinity of the inner periphery of the cylinder while substantially no heat exchange occurs in the other material portion present in the vicinity of the screw.

Moreover, with the above-described construction, since the plurality of holes are defined in the stationary disc, the heat exchange occurs when the material contacts the surface of the stationary disc and also when the material passes along the inner peripheral faces of the respective holes defined in the disc. That is, the sum total of the surface area of the stationary disc and the surface areas of the inner peripheral faces of the holes, if its number is appropriately increased, may be greater than the entire heat-conductive surface area of the cooling water passage of the prior art (with respect to the unit length along the axial direction of the cylinder). Therefore, in comparison with the conventional apparatus, the apparatus of the invention allows increase of the heat-conductive, i.e. heat-exchangeable surface area available for the material, such that the heat exchange may be effected in more efficient manner.

Further, with the above construction, the temperature control system comprises the flow passage and the temperature control means both included in the stationary disc. Thus, the system may be implemented through improvement of an existing kneading-mixing mechanism. As a result, the entire system may be more simple than the convention using the water passage disposed about the outer periphery of the cylinder, so that the costs of the entire apparatus may be reduced.

Moreover, this temperature control system may be used in combination with the conventional temperature control system for controlling the temperature of the outer periphery of the cylinder by means of the water passage filled with the cooling or heating fluid.

In this case, as the heat exchange effect obtained from the conventional temperature control system and that obtained from the system of the invention are combined for mutual enhancement, this combination system may effect the temperature control in still more effective manner. As a result, the processing temperature of the material may be maintained within a predetermined range, whereby the workability of the material and the quality of the end product will be further improved.

According to a further aspect of the invention, the temperature control means includes a temperature sensor for measuring the temperature of the stationary disc, a temperature setting unit for setting a temperature of the stationary disc, a comparator unit for comparing the temperature measured by the temperature sensor with the temperature set by the temperature setting unit, and an instructing unit for adjusting a flow speed of a pump based on a temperature difference obtained from the comparison by the comparator unit.

With this construction, the temperature of the stationary disc is set to a predetermined temperature, and this predetermined temperature is compared with an actual disc temperature measured by the temperature sensor to produce a temperature difference. Then, based on this temperature difference, the flow speed of the fluid circulating in the flow passage incorporated in the fixed disc may be appropriately varied so as to cause the actual temperature to equal the predetermined target temperature. In this way, an automatic temperature control of the stationary disc may be readily executed.

BEST MODE FOR CARRYING OUT THE INVENTION

Preferred embodiments of the invention will now be described in details with reference to the accompanying drawings.

(1) Kneading-Mixing Extruder Apparatus

There will be described a kneading-mixing extruder apparatus as a typical apparatus in which a temperature control system of the invention is used. As shown in FIGS. 1–5, this apparatus includes a metering device 1 for separately and continuously measuring plural kinds of raw materials, a receiver tank 2 for receiving the raw material 60 fed from the metering device 1, a degassing tank 3 for degassing the material 60, a kneading-mixing transporting device 4 for transporting the material 60 while kneading and mixing the same, and a molding mechanism 5 for molding the material 60 while extruding the same. Further, on the downstream of the terminal stage of this kneading-mixing extruder apparatus, there are provided in series an automatic cutter device 6 and an automatic stamping device 7 as aftertreatment devices for the extruded product.

The metering device 1 includes a first metering unit 8 for measuring and feeding the main raw material and a second metering unit 9 for measuring and feeding an additional material such as flavoring agent, coloring agent or the like, with these metering units 8, 9 being disposed on the upstream of the receiver tank 2 for charging the material 60, relative to the material feeding direction.

The receiver tank 2 includes a receiver hopper 10 defining a mixing area for stirring and mixing the material 60. And, at the bottom of this hopper 10, a horizontal transporting screw 11 is provided to extend through the bottom in the forward-to-rear direction. So that, the material 60 charged into the tank 2 is stirred and mixed therein and then forcibly discharged through a discharge opening of the bottom.

The transporting screw 11 receives power from a drive motor 12 disposed adjacent one end thereof on the upstream in the transporting direction of the material 60, and, adjacent the other end of the screw 11, there are provided the kneading-mixing mechanism 16 which is substantially same as a kneading-mixing mechanism 16 provided in a kneading-mixing transporting device 4 to be described later. In operation, by the forcible sending action of the transporting screw 11, the material 60 is transported to the downstream to be caused to pass the kneading-mixing mechanism 16.

Incidentally, the feeding amount of the material 60 from the receiver tank 2 and the feeding amount of the material 60 from the metering device 1 are set such that a predetermined fixed amount of material 60 is always present in the receiver hopper 10 of the receiver tank 2. More particularly, a pair of level sensors 13 are disposed inside the receiver hopper 10 for respectively detecting upper and lower limit levels of the material 60 present therein. And, the feeding amount of the metering device 1 is controlled by an unillustrated controller SO that the upper level of the material 60 is always present between the upper and lower limit levels.

The degassing tank 3 includes a vacuum chamber 15 for providing a degassing area where the material 60 is depressurized to have its air content reduced in the course of the transportation of the material to the kneading-mixing transporting device 4. More particularly, the vacuum chamber 15 is communicated with a vacuum pump vp, and also the transport passage portion from the receiver hopper 10 to the outlet opening of the transporting screw 11 is closed by the presence of the material 60 therein. Hence, the inner space of this vacuum chamber 15 may be used as a depressurizing space, and by maintaining this space under the depressurized condition, the material 60 present therein may be degassed.

Further, the vacuum chamber 15 includes an opening 15a provided on a virtual axial extension line of the screw 11, and a lid 14 is provided for opening and closing this opening 15a. Then, by opening this lid 14, various maintenance operations may be readily made therethrough, such as attaching and detaching operations of the screw shaft of the screw 11 or of the kneading-mixing mechanism 16 disposed adjacent the terminal end of the screw.

As shown in FIGS. 1–4, the kneading-mixing transporting device 4 includes a pair of transporting screws consisting of a first transporting screw 17 disposed on the upstream side and a second transporting screw 18 disposed on the downstream side, and the kneading-mixing mechanism 16 interposed between the first and second screws 17, 18. As communicated with the vacuum chamber 15 formed at the bottom of the degassing tank 3, the inside of this kneading-mixing transporting device 4 too is maintained under the depressurized condition. Accordingly, the material 60 when transported by the two transporting screws 17, 18 is maintained under the depressurized condition and is kneaded and mixed under this condition. The first and second transporting screws 17, 18 respectively include transporting screw shafts 17A, 18A and cylinders 17B, 18B incorporating these screw shafts 17A, 18A. Thus, the kneading-mixing mechanism 16 is disposed between the upstream first screw shaft 17A and the downstream second screw shaft 18A and between the cylinders 17B, 18B incorporating these respective screw shafts 17A, 18A.

Figure 2:
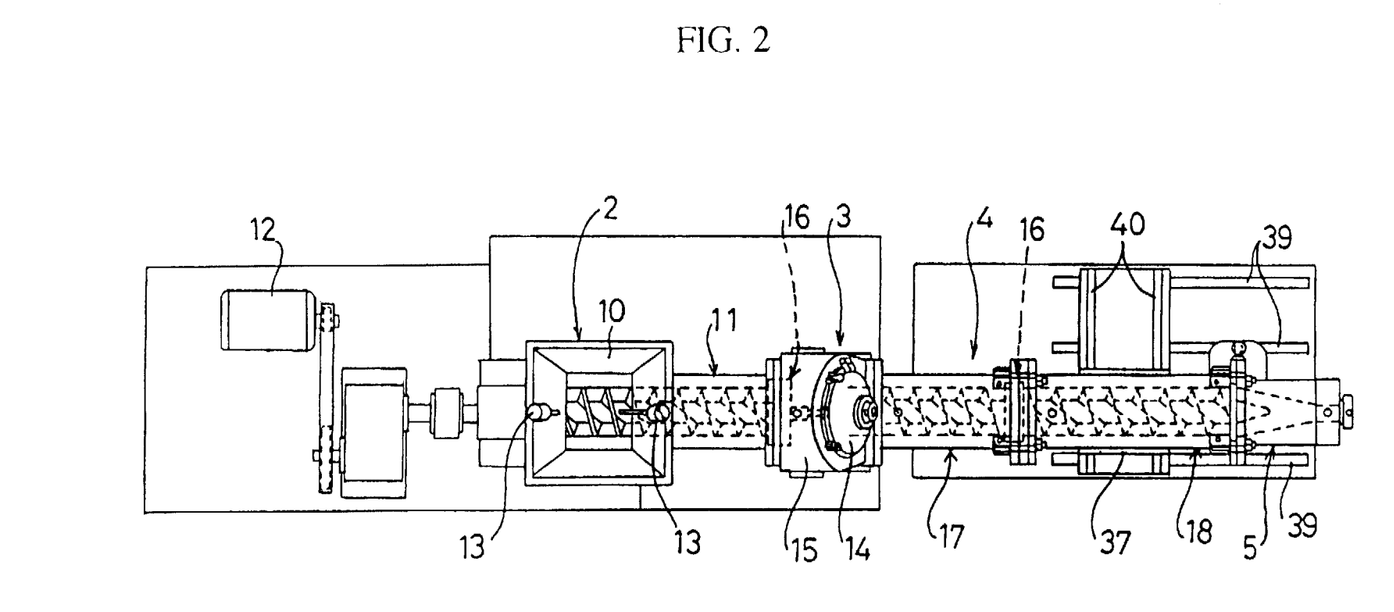
FIG. 2 is a plan view showing the entire kneading-mixing extruder apparatus.
Figure 3:
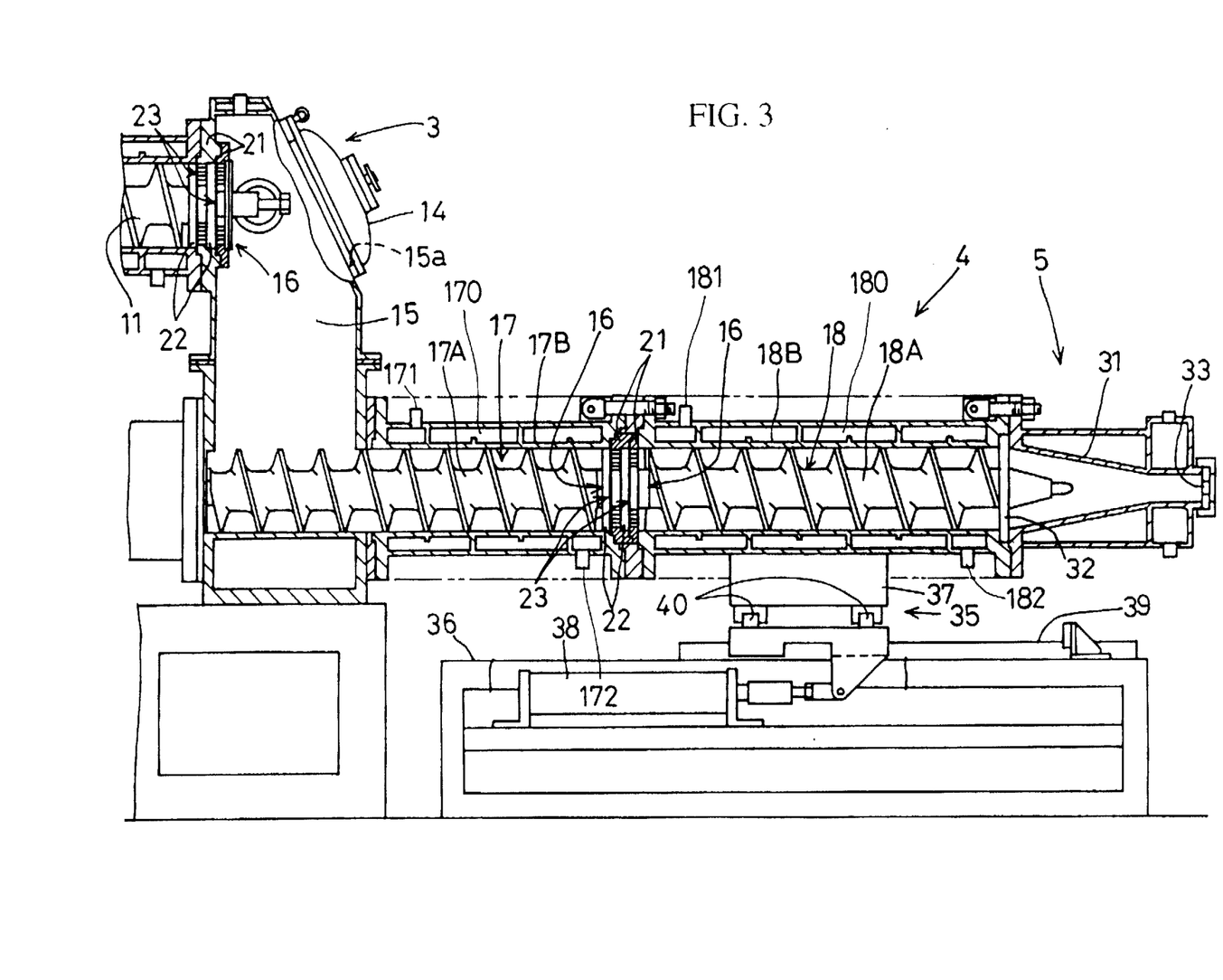
FIG. 3 is a section view showing a portion of the kneading-mixing extruder apparatus.

As shown in FIG. 3, around the outer periphery of the cylinder 17B, there is provided a cooling water passage 170 for cooling the transported material. This cooling water passage 170 is supplied with cooling water from an inlet opening denoted with a reference numeral 171 and the water is discharged from an outlet opening denoted with a numeral 172. More particularly, this cooling water passage 170 extends in the form of spiral along the outer periphery of the cylinder 17B, so that the cooling water supplied from the inlet opening 171 circulates in the form of spiral along the outer periphery of the cylinder 17B thereby to cool this cylinder 17B. With this cooling of the cylinder, a heat exchange takes place between the cooled cylinder 17B and the hot material 60 transported inside the cylinder, so that the material 60 is cooled. Similarly, a substantially same cooling mechanism is provided around the outer periphery of the cylinder 18A. That is, this cooling mechanism includes an inlet opening 181 for introducing cooling water, a cooling water passage 180 for circulating the introduced cooling water, and an outlet opening 182 for discharging the cooling water after its circulation through the passage 180. Incidentally, devices for operating these cooling mechanism, i.e. a pump for feeding the cooling water to the inlet openings 171, 181, a tank for receiving and storing the water discharged from the outlet openings 172, 182, and a flow amount controller for controlling the flow speed of the cooling water, may be provided outside the kneading-mixing extruder apparatus shown in FIGS. 2 and 3. Accordingly, these devices are not shown in these figures. The above-described cooling mechanisms will be generically referred here to as a cylinder outer periphery temperature control device.

Referring to the screw pitches of the transporting screws 17, 18, the upstream screw shaft 17A has a slightly greater pitch than the downstream screw shaft 18A. Then, by the force from an electric motor 19 shown, these screws are rotatably driven at 5–30 rpm approximately, via an appropriate reduction mechanism.

The construction of the kneading mechanism 16 will be described next.

The kneading mechanism 16 includes a plurality of unit kneading mechanisms 20 disposed one after another along the transporting direction of the material 60, each unit kneading mechanism 20 including a stationary disc 21A, 21B non-rotatably fixed to the respective cylinders 17B, 18B acting as outer casings of the kneading-mixing transporting device 4, and a filter 23 interposed between the discs 21, 22.

Figure 4:
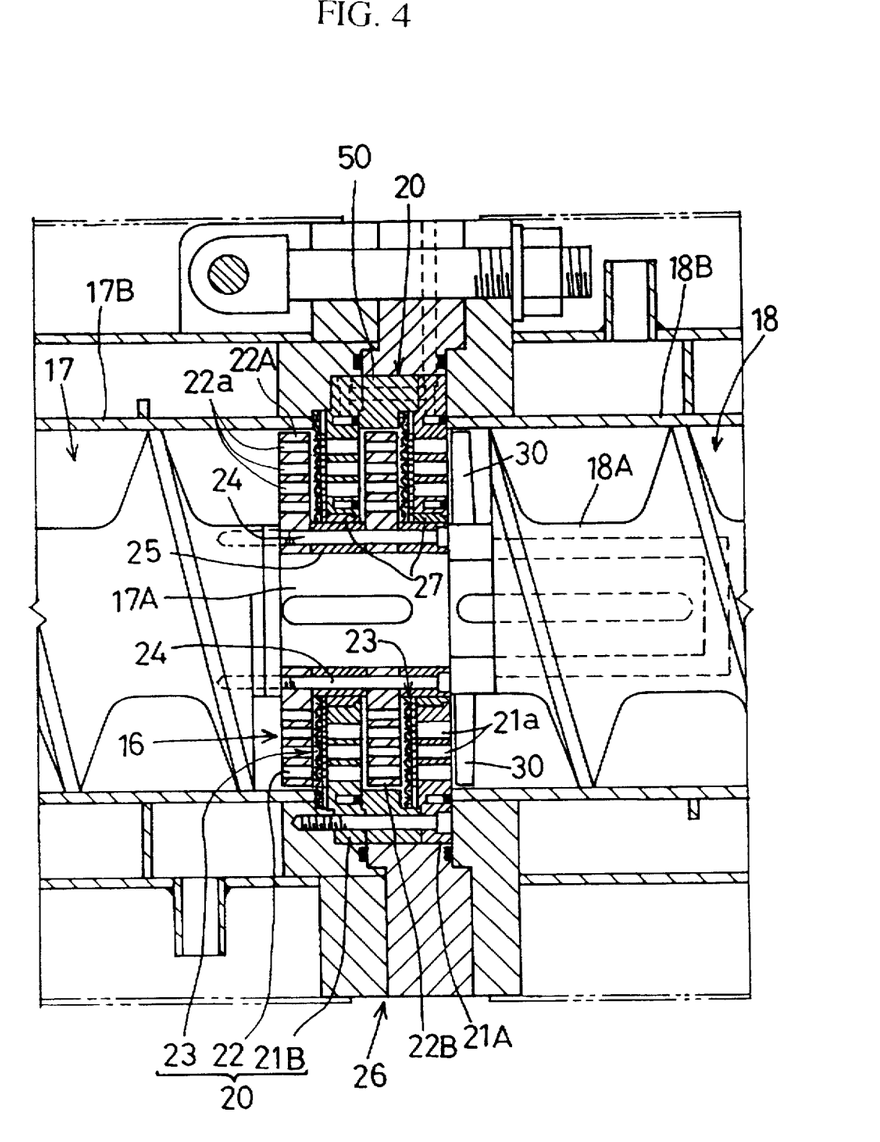
FIG. 4 is an enlarged section view showing, in particular, a kneading-mixing mechanism of the kneading-mixing extruder apparatus.

More particularly, as shown in FIGS. 3 and 4, each unit kneading mechanism 20 includes the rotary disc 22 connected to the transport terminal end of the first screw shaft 17A to be rotated with this first screw shaft 17A and defining a plurality of through holes 22a extending through in the screw axis direction, the stationary disc 21 fixedly disposed between the rotary disc 22 and the second screw shaft 18A and facing the second screw shaft 18A and defining a plurality of through holes 21a extending through in the screw axis direction, and the filter 23 interposed between the above discs 21, 22.

The number of the unit kneading mechanism 20 is not particularly limited. In the instant embodiment, two of them are provided, so that the rotary disc 22A, stationary disc 21B, rotary disc 22B and the stationary disc 21A are disposed one after another in the mentioned order from the upstream side in the material transporting direction. Further, between the upstream stationary disc 21B and the downstream stationary disc 21A, an intermediate spacer ring 50 is disposed for providing a fixed axial spacing for allowing rotation of the downstream rotary disc 22B.

In operation, as the material 60 is forcibly passed between the stationary disc 21 and the rotary disc 22 rotating relative to the stationary disc 21, a strong kneading and mixing force is applied to this material for kneading and mixing the same.

More particularly, each of the rotary disc 22 and stationary disc 21 defines the through holes 22a, 21a for the material 60 with the hole area rate of approximately 50%. Thus, when the material present in the first transporting screw 17 is caused to pass through these through holes 22a, 21a, the passage speed of this material is increased up to about twice as high as the passage speed of the material within the first transporting screw 17. Then, with this sudden increase in the moving speed of the material when pressed into the holes, a kneading action is applied to the material 60 through its own plastic deformation.

The stationary disc 21 and intermediate spacer ring 50 each includes a flow passage as a part of a kneading mechanism temperature control device 200 as the temperature control system of this invention. The construction of this device will be described later.

When the material 60 under the rotation of the rotary disc 22 is forcibly fed into the through holes 21a of the stationary disc 21, the material is subjected to the kneading action due to a shearing force generated between the discs 21, 22 rotated relative to each other. Further, between the discs 21, 22, there is interposed the filter 23 having through holes of sufficiently smaller diameter than the through holes 21a, 22a of these discs 21, 22. Accordingly, the material 60 is subjected also to a further kneading action from the filter by being finely dispersed therethrough in the course of the above-described kneading operation. With these kneading actions combined, very fine and good kneading of the material is made possible.

Next, the kneading mechanism temperature control device 200 as the temperature control system of the invention will be described.

Figure 7:
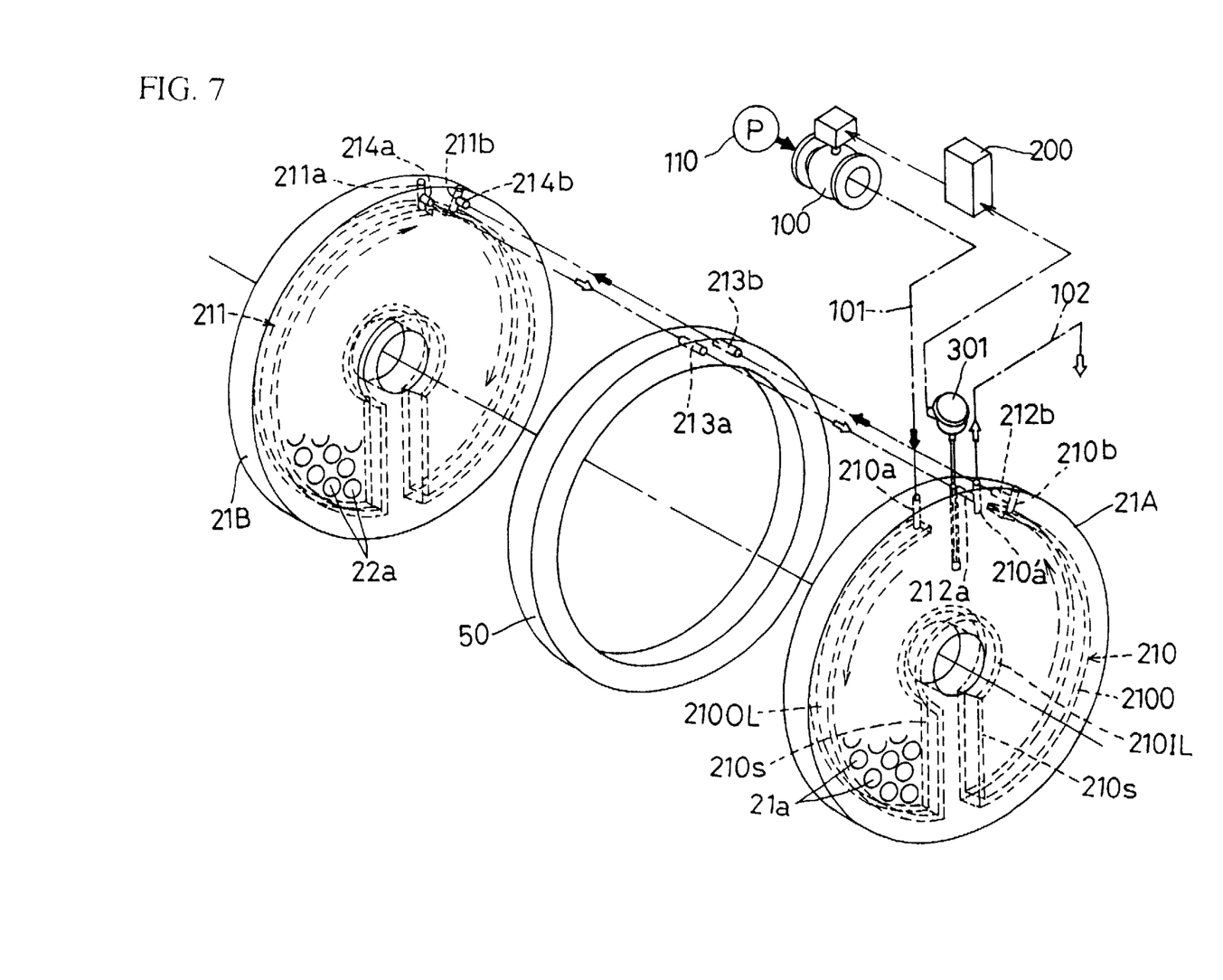
FIG. 7 is an explanatory view showing a construction of a temperature control system and temperature control means thereof.
Figure 8:
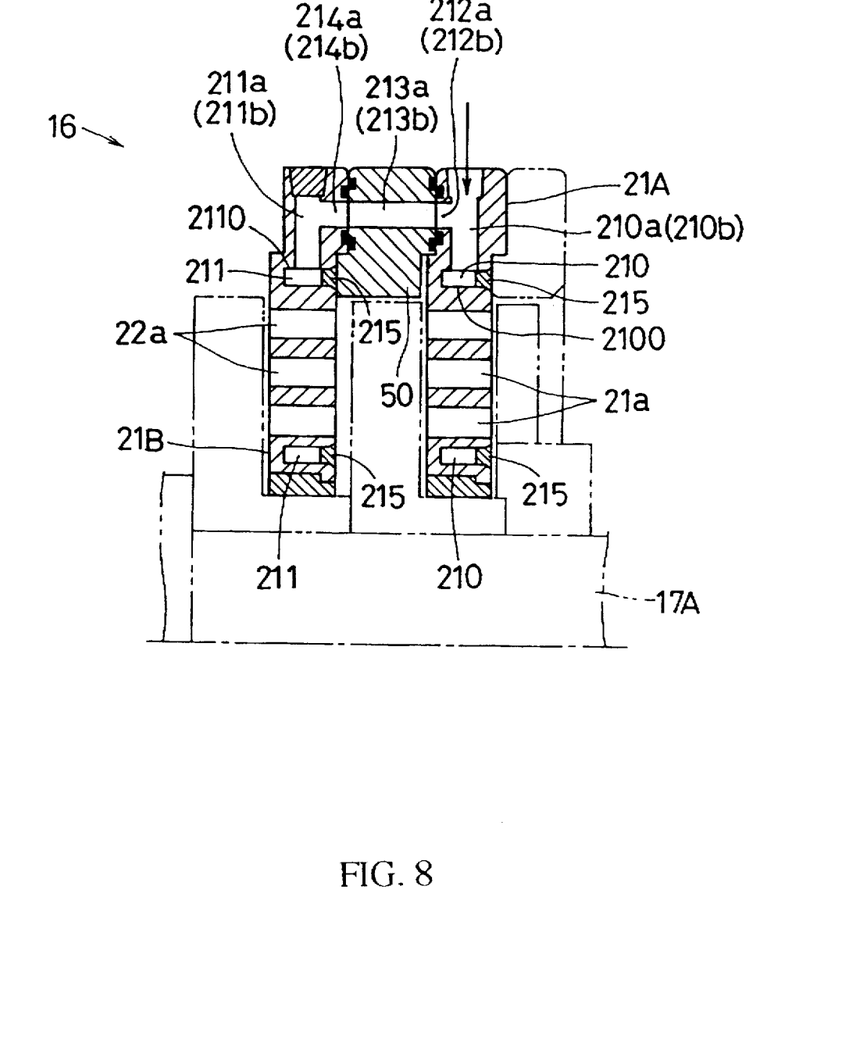
FIG. 8 is a cross section of the temperature control system.

As shown in FIGS. 7 and 8, the kneading mechanism temperature control device 200 includes flow passages 210 ('the first flow passage' hereinafter) and 211 ('the second flow passage' hereinafter) formed respectively in the downstream stationary disc 21A (to be referred to also as the first stationary disc) and the upstream stationary disc 21B (to be referred to also as the second stationary disc), flow passages 212a, 212b, 213a, 213b, 214a, 214b extending horizontally for communicating the first flow passage 210 and the second flow passage 211 with each other, flow passages 210a, 210a', 210b, 211a, 211b extending in substantially radial direction of the cylinder 17B, a pump 110 as fluid supply means for supplying cooling water to the above flow passages, a passage 101 for guiding the cooling water from the pump 110 to the flow passage 210a, and a further passage 102 for discharging the cooling water after its circulation through the respective flow passages formed in the stationary discs 21A, 21B and the intermediate ring 50.

Now, the circulation circuitry of the cooling water will be described. First, the cooling water fed from the pump 110 is supplied via the passage 101 to the inlet opening 210a of the stationary disc 21A. This water circulates through the first flow passage 210 to cool the stationary disc 21A and then circulates through the flow passages 210b, 212b, the flow passage 213b of the intermediate ring 50, the flow passages 214b, 211b of the upstream stationary disc 21B and flows into the second flow passage 211. Thereafter, the cooling water circulates through this second flow passage 211 to cool the stationary disc 21 and then flows through the flow passages 211a, 214a, the flow passage 213a formed in the intermediate ring 50 and then flow passages 212a, 210a' of the stationary disc 21A and eventually flows into the discharge passage 102 to be discharged into a tank (not shown).

The first flow passage 210 includes a discontinuous outer loop portion 210 OL extending in the peripheral direction adjacent the outer peripheral face of the stationary disc 21A, a discontinuous inner loop portion 210 IL extending in the peripheral direction and radially inwardly of the outer loop portion, and two flow passages 210s, 210s communicating the outer loop portion 210 OL and the inner loop portion 210 IL with each other. With this, both the inner peripheral portion and the outer peripheral portion of the stationary disc 21A may be cooled and the entire stationary disc 21A may be efficiently cooled to a desired predetermined temperature. As may be clearly understood from FIG. 7, the second flow passage 211 has a substantially identical construction to that of the first flow passage 210. Therefore, the construction of this second flow passage 211 will not be described.

For forming the first flow passage 210 in the inner face of the stationary disc 21A, as may be seen from FIG. 8, first, a groove 2100 having a predetermined depth is formed in the surface of the stationary disc 21A. Then, a lid element 215 is press-fitted into the groove 2100 over the entire length thereof to cover the surface of this groove 2100. Thereafter, the lid element 215 is welded to the stationary disc 21, thereby to complete the flow passage. The second flow passage 211 may be formed in the same manner and the description of the method will not be described in repetition.

Figure 9:
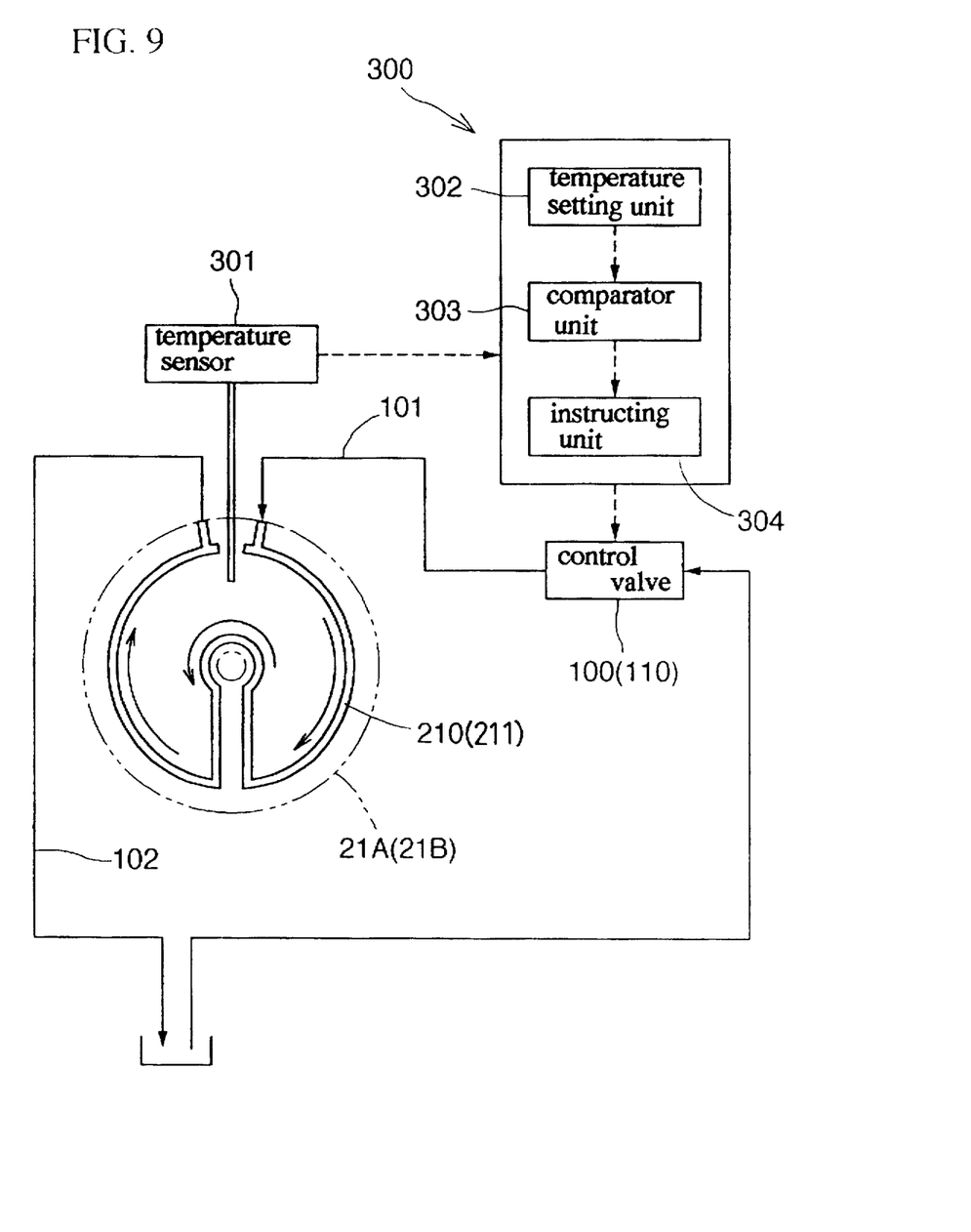
FIG. 9 is a block diagram illustrating a feedback control scheme executed by the temperature control means.

Next, a temperature control means 300 for controlling the temperature of the cooling water will be described with reference to FIG. 9.

The temperature control means 300 includes a temperature sensor 301 incorporated within the stationary disc 21A for measuring the temperature of this disc 21, a temperature setting unit 302 for setting a desired temperature of the stationary disc 21, a comparator unit 303 for comparing the temperature measured by the temperature sensor 301 with the temperature set by the temperature setting unit, and an instructing unit 304 for generating an instruction for adjusting a flow speed of the cooling water, based on a temperature difference obtained from the comparison by the comparator unit 303, by controlling an opening/closing degree of a control valve 100. In this respect, the instructing unit 304 controls the control valve 100 in such a manner that the greater the difference between the measured temperature and the target temperature of the stationary disc 21, the greater the flow amount of the cooling water fed from the pump 110 to increase correspondingly the flow speed of the fluid circulating in the first and second flow passages 210, 211.

The fluid supply means includes the pump 110 and the control valve 100 whose opening/closing degree is controllable. Further, the pump 110 may incorporate the control valve 100.

As shown in FIG. 4, the first screw shaft 17A and the second screw shaft 18A are keyed with each other to be rotatable in unison; and also the first screw shaft 17A is keyed also with the upstream rotary disc 22.

The downstream rotary disc 22 is fixedly connected with the first screw shaft 17A by means of a plurality of attaching bolts 24. Between the two rotary discs 22, the screw shaft 17A mounts thereon a spacer 25 having through bores into which the attaching bolts 24 may be inserted. That is, the first screw shaft 17A, the two rotary discs 22 and the spacer 25 are fixedly connected with each other for co-rotation via the attaching bolts 24.

The stationary disc 21 is fixed to a casing 26 of the kneading mechanism 16 comprised of the connection between the first cylinder 17B incorporating the first screw shaft 17A and the second cylinder 18B incorporating the second screw shaft 18A.

Further, this stationary disc 21 rotatably supports the first screw shaft 17A via bearing elements 27 made of resin and fitted on the spacer.

Figure 5:
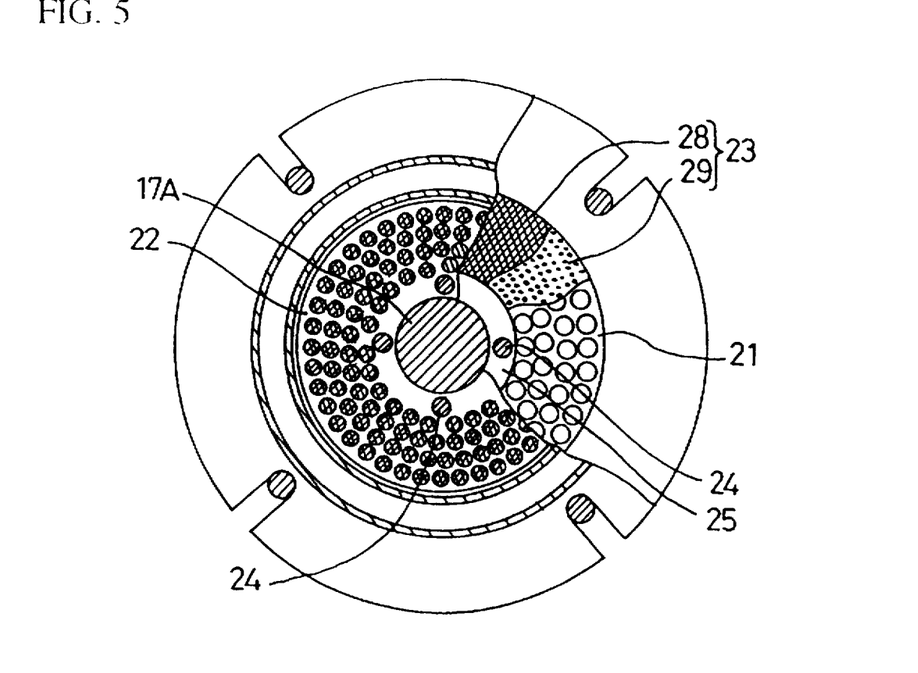
FIG. 5 is a partial section view of the kneading-mixing mechanism.

The filter 23, as shown in FIG. 5, includes a disc mesh 28 having a meshing needed for filtering of the raw material and a punching plate 29 having a great number of holes smaller in diameter than the through bores 21a, 22A of the discs 21, 22. Then, as shown in FIG. 4, this filter 23 is fixedly disposed between the stationary disc 21 and the rotary disc 22. With this filter 23, the disc mesh 28 is set on the upstream side in the transport direction of the material 60 and the punching plate 28 is set to the rear side, so that the disc mesh 28 may be reinforced in case the through holes 21a of the stationary disc 21 are somewhat enlarged to avoid clogging of the material. And, the filter together with the disc mesh 28 together constitute a filter means for the raw material 60.

The filter 23, with the disc mesh 28 being set on the upstream side in the transporting direction of the material 60 relative to the punching plate 29, is disposed adjacent the front face of the stationary disc 23 with a clearance of 0.5–3 mm approximately from the upstream rotary disc 22. The disc mesh 28 is-formed of metallic material (e.g. stainless steel: JIS SUS 304) and its meshing in the order of #20–#50 is preferred for kneading of soap material. The punching plate 29 too is formed of similar metallic material (e.g. stainless steel: JIS SUS 304) and has a thickness of about 0.8–2.0 mm, a hole diameter of about 0.5–2 mm, and a hole area rate of about 25–50%. And, these punching plate 29 and the disc mesh 28 are integrally bonded to each other through the respective peripheral edges thereof bonded by appropriate bonding means such as soldering.

The above-identified specifics of the meshing of the disc mesh 28 and the plate thickness, hole diameter and the hole area rate of the punching plate 29 and the clearance from the rotary disc 22 are determined from the following consideration. Namely, in case soap raw material is used as the raw material 60, with the above specifics, soap with an appropriate ratio between the type crystals and type crystals may be readily obtained. Specifically, if the values of the meshing, hole diameter, hole area rate or the clearance were set wide apart from the above-identified respective ranges, this would result in insufficient kneading of the raw material 60 which leads to insufficiency of type crystals, or result conversely in excessive kneading of the material which leads to insufficiency of the type crystals. In this respect, soap having a large amount of type crystal is hard to dissolve; whereas, sop having a large amount of type crystal has good bubbling property. Thus, the above setting values may be selected within the above-identified ranges, depending on the ratio of which of these crystal types is considered more important than the other. Further, it is advantageous that a plurality of types of filters 23 having differing values should be prepared so allow selection from these in accordance with a particular need for the ratio between these crystal types.

Incidentally, a numeral 30 in FIG. 4 denotes a cutter blade fixedly connected with the first screw 17A, and this cutter blade is disposed so as to face the downstream side face of the last stationary disc 21.

As shown in FIG. 3, the molding mechanism 5 includes a constricted cylinder member 31 pivotably connected with the terminal end of the second cylinder 18B to be opened and closed, a rectifying plate 32 disposed forwardly of the constricted cylinder member 31 and having a number of small holes, and an extruder die 33 disposed rearwardly of the constricted cylinder member 31.

Figure 1:
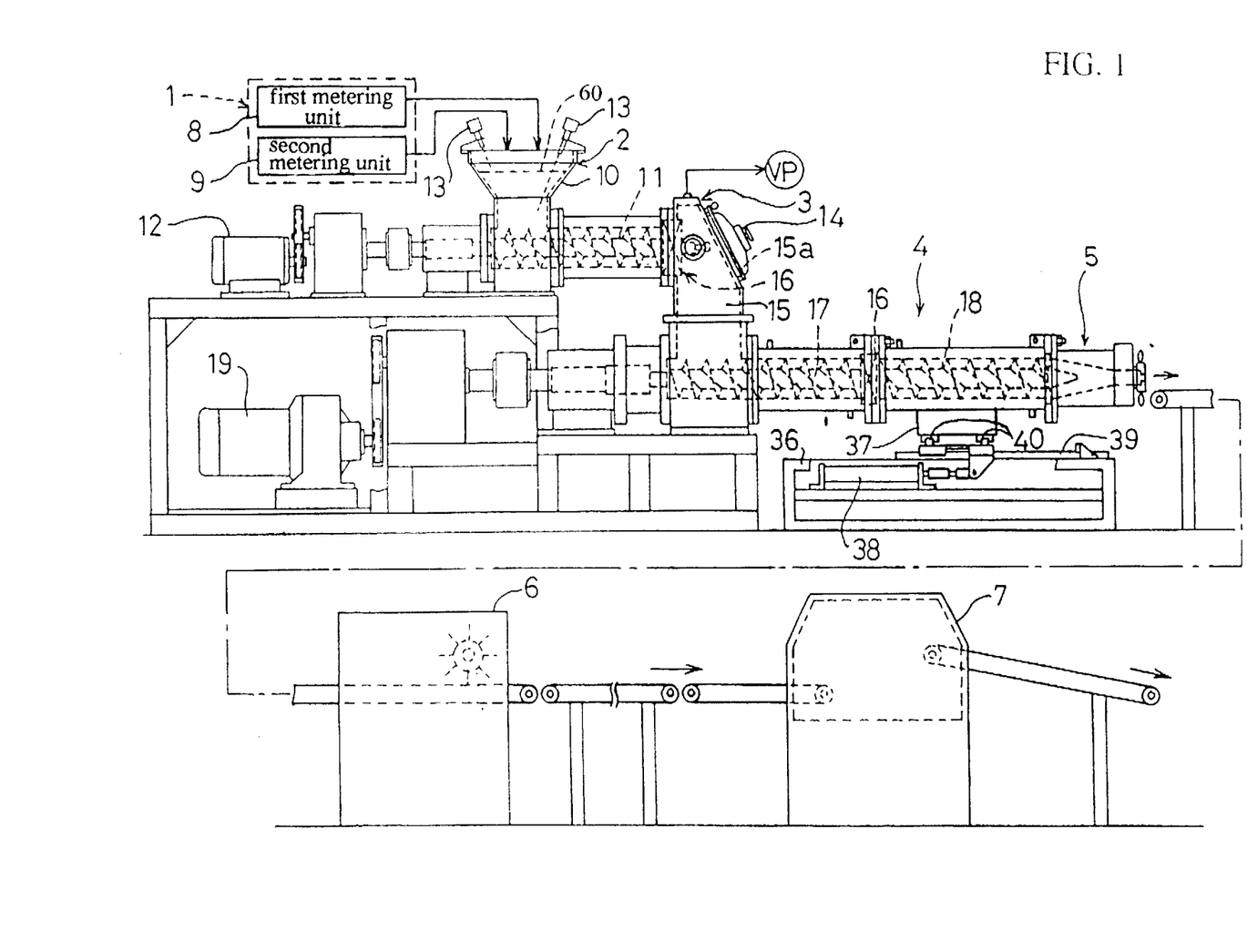
FIG. 1 is a side view showing an entire kneading-mixing extruder apparatus.

Referring to FIGS. 1 through 3, downwardly of the kneading-mixing transporting device 4, there is provided a moving device 35 for supporting the downstream second transporting screw 18 and changing its forward/rear and right/left orientation when this second transporting screw 18 is dismounted from the apparatus.

The moving device 35 includes a fixed deck 36, a movable deck 37 movable relative to the fixed deck 36 along the length of the transporting screw, a first guide rail 39 disposed on the fixed deck 37 for guiding the movement of the movable deck 37 along the length of the second transporting screw 18, and a second guide rail 40 for causing the movable deck 37 to move in a direction normal to the first guide rail 39. With this moving device 35, for moving the second transporting screw 40 mounted on the movable deck 37 along the direction normal to said direction, the screw mounted on the movable deck is manually pushed sideways to move on the transversely oriented second guide rail 40.

The automatic cutter device 6, disposed on the downstream of the discharging end of the above-described multistage vacuum extruder apparatus, comprises a conventional device of this type for cutting the bar-shaped material 60 extruded from the extruder die 33 into pieces of a predetermined size.

The automatic stamping device 7, disposed on the downstream of the cutter device 6, comprises a well-known stamping device for stamping a predetermined mark, product name or the like on the cut material 60.

II. Extruding Method Using the Extruder Apparatus (Vacuum Extruder Apparatus):

Next, there will be described an extruding method using the vacuum extruder apparatus as an example of the apparatus implementing the temperature control system of the invention.

This extruding method includes: [1] a metering step for separately and continuously metering a plurality of kinds of raw materials and then continuously charging the measured materials into the degassing tank 3; [2] a mixing-degassing step for stirring and mixing the plural kinds of materials continuously charged and degassing the mixture through depressurization of the space where the mixture is present; [3] a kneading-mixing step for kneading the mixture material under the depressurized condition in the course of its transport through plural stages of kneading mechanisms; and [4] an extruding step for extruding the kneaded material into a predetermined initial shape. These steps and also the following steps of [5] a cutting step and [6] a stamping step are effected in the serial order of [1] through [6] to be described next.

[1] metering step

On the upstream, in the feeding direction of the material 60, of the receiver tank 2 for charging the raw material 60, there are disposed the first metering unit 8 for measuring and feeding the main raw material and the second metering unit 9 for measuring and feeding an additional material such as flavoring agent, coloring agent or the like. After metering, the main material and additional material are charged into the receiver tank 2 continuously.

[2] mixing-degassing step

The material 60 charged into the receiver tank 2 is stirred and mixed by the transporting screw 11 disposed at the bottom of this receiver tank 2 and acting also as a stirring means, and then fed into the kneading transporting device 4 connected with the lower end of the degassing tank 3. In this, the vacuum chamber 15 formed downwardly of the first kneading mechanism 16 disposed on the downstream of the transporting screw 11 is connected with the flow passage extending to the vacuum pump, so that this vacuum chamber 15 provides a depressurizing space. In this depressurizing space and through reduction of pressure therein, the material 60 has its air or gas content eliminated.

[3] kneading-mixing step

The kneading-mixing transporting device 4 is communicated with the lower portion of the vacuum chamber 15 of the degassing tank 3, so that the inside of the cylinders 17B, 17A of this kneading-mixing transporting device 4 too is maintained under the depressurized condition by the action of the vacuum pump. Accordingly, when the material 60 is transported by the transporting screw 18, the material is subjected to the kneading and mixing function while being maintained under the depressurized condition.

[4] extruding step

At the terminal end of the transport passage of the transporting screw 18, the extruder die 30 is fixed to the cylinder 17, so that the material is extruded therefrom into a bar-like shape due to the extruding action of the transporting screw 18.

[5] cutting step

The bar-like material 60 extruded from the extruder die 30 is cut into a predetermined size by the cutter device 6 disposed on the downstream of the vacuum extruder apparatus in the material transport direction.

[6] stamping step

In this step, a predetermined stamp of a mark, product name or the like is stamped on each cut material 60.

Figure 10:
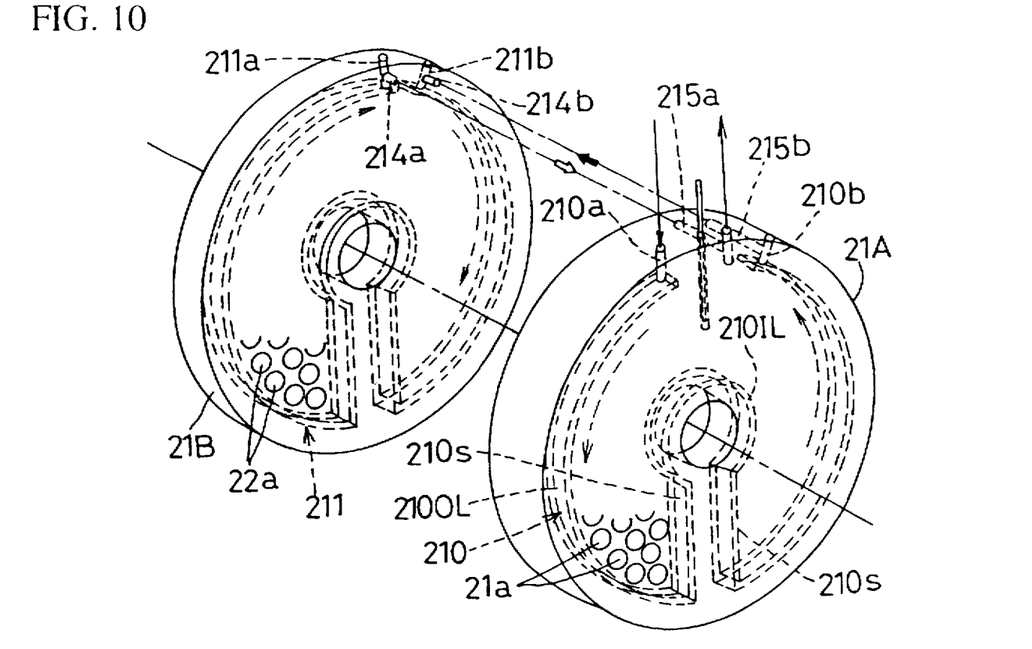
FIG. 10 is a perspective view showing a temperature control system according to a further embodiment.
Figure 11:
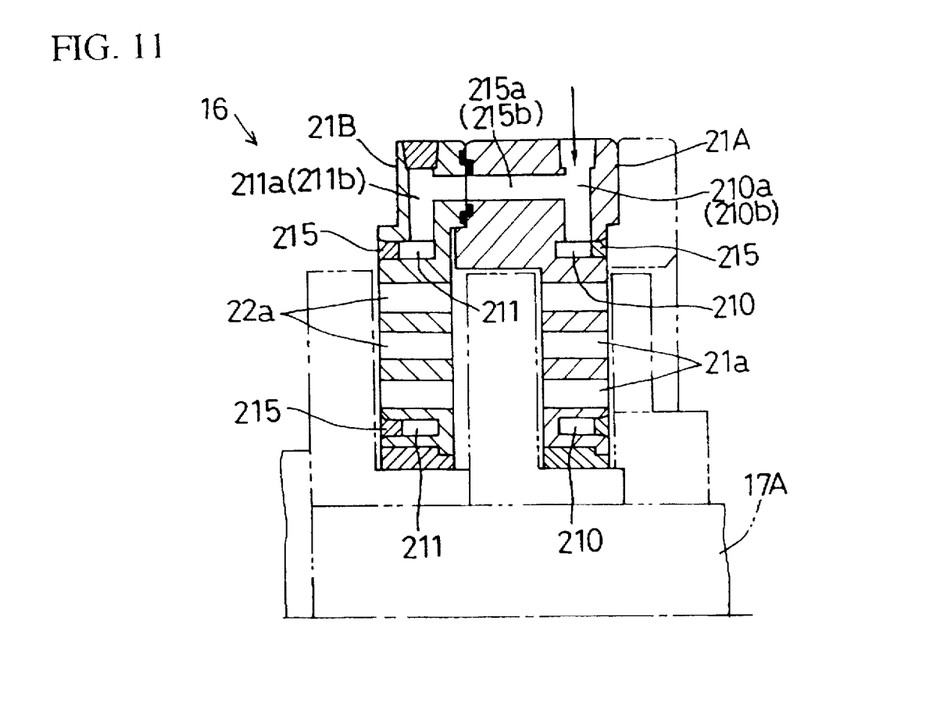
FIG. 11 is a cross section of the temperature control system of the further embodiment.

FURTHER EMBODIMENTS (1) In the foregoing embodiment, the intermediate ring 50 is interposed between the downstream stationary disc 21A and the upstream stationary disc 21B of the kneading mechanism 16. Instead, as shown in FIGS. 10 and 11, an upstream outer peripheral portion of the downstream stationary disc 21A may be axially extended by an amount corresponding to the thickness of the intermediate ring 50. Further alternatively, instead of extending the upstream outer peripheral portion of the downstream stationary disc 21A, the outer peripheral portion of the upstream stationary disc 21B may be extended to the downstream direction so as to act also as the intermediate ring 50. In this further embodiment, as may be clearly seen in FIGS. 10 and 11, the flow passages 215a, 215b formed in the outer periphery of the downstream stationary disc 21A are extended in the axial direction to function also as the 212a, 212b, 213a, 213b shown FIGS. 7 and 8.

(2) In the foregoing embodiment, the kneading mechanism 16 includes two unit kneading mechanisms 20. Instead, the temperature control system of the invention may be used in a kneading extruder apparatus including one kneading mechanism 16 or having more than three unit kneading mechanisms 20.

Figure 6:
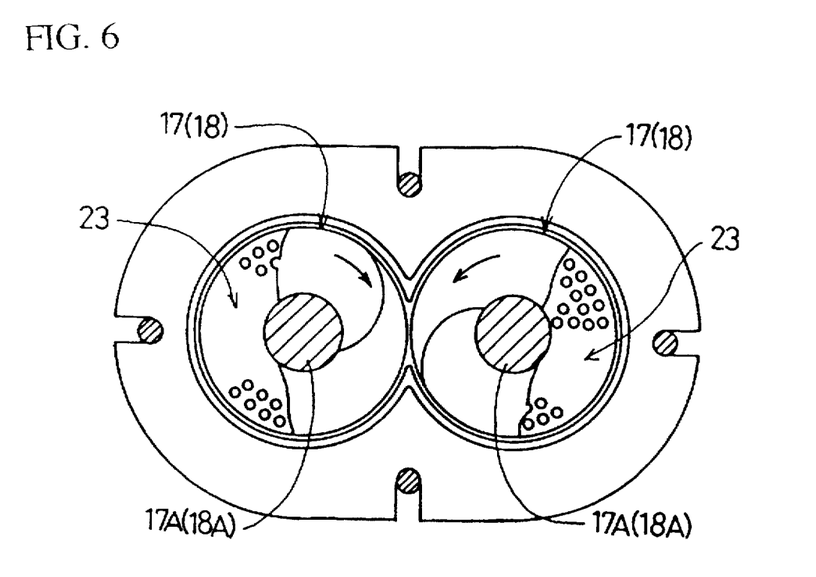
FIG. 6 is an explanatory view showing a portion of a kneading-mixing extruder apparatus according to a further embodiment.

(3) In the foregoing embodiment, the kneading-mixing extruder apparatus implementing the temperature control system comprises the single-screw type extruder apparatus such as shown in FIG. 5. Instead, as shown in Fig. 6, the apparatus may be a double-screw type including a plurality of transporting screws 17, 18 disposed in parallel to each other so as to treat the material 60 from the degassing tank 3 through more than two passages.

In this case, the filter 23 too may be a double-screw type filter including a plurality of single-screw type filters of FIG. 5 for treating the material 60 through one passage, with the filters being integrally connected to each other via respective peripheral edges thereof.

(4) In the foregoing embodiment, the temperature control system employs the kneading mechanism temperature control device attached to the stationary disc of the kneading mechanism in combination with the cooling water passages (i.e. the cylinder outer periphery temperature control device) formed in the outer periphery of the cylinder and extending in the form of spiral in the axial direction of the cylinder. Instead, the temperature control system may use only the kneading mechanism temperature control device, without the cylinder outer periphery temperature control device.

(5) In the foregoing embodiment, the flow passages of the temperature control are in the form of loops extending in the vicinity of the outer and inner peripheries of the stationary disc and communicated with each other. Instead, various other shapes and arrangements will be possible, such as addition of an intermediate loop to the outer and inner loops.

(6) The foregoing embodiment describes the kneading-mixing extruder apparatus including the metering device, receiver tank, degassing tank, mixing transporting device and the extruding mechanism. Alternatively, the temperature control system of the invention may be used in various other types of apparatuses using the transporting screw and kneading mechanism in combination.

(7) As soap should be maintained at an elevated temperature, it is understood that the 'fluid' as defined in the disclosed embodiments is not limited to cooling water but includes also any heating medium such as hot water. Further, the cooling water may be replaced by any other cooling medium such as ethylene glycol (antifreeze agent) or the like.

The kneading-mixing extruder apparatus implementing the present invention may be used for processing any other material than the soap material, such as oils and fats, food product, medical product, and so on.

Though the claims include reference numbers or symbols for convenient comparison with the accompanying drawings, such inclusion does not limit the present invention to the structures as shown in the drawings.

I claim:

1. A kneading-mixing extruder apparatus comprising:

a receiver tank for receiving raw material, the receiver tank having an opening for discharging and supplying therethrough the material into a cylinder;

said cylinder incorporating a screw for extruding and transporting the material within the cylinder;

a kneading-mixing mechanism disposed along the length of the cylinder for kneading and mixing the material; and a molding mechanism disposed along the length of the cylinder for molding the material;

said kneading-mixing mechanism including a rotary disc rotatable with said screw and a plurality of stationary discs fixed to the cylinder, the rotary disc and the stationary discs having a plurality of holes and being disposed side by side in an axial direction of the cylinder;

said plurality of stationary discs including a first stationary disc and a second stationary disc, said first stationary disc forming a first flow passage extending from the vicinity of a center through to the vicinity of a periphery thereof and defining an inlet opening and an outlet opening for said first flow passage, said second stationary disc including a second flow passage extending from the vicinity of a center through to the vicinity of a periphery thereof and defining an inlet opening and an outlet opening for the second flow passage, said first and second flow passages being in communication with each other;

fluid supply means communicating with said inlet and outlet openings for supplying fluid in circulation; and temperature control means for controlling temperature of the material present inside the holes of said stationary discs;

said temperature control means including a temperature sensor for measuring the temperature of the stationary discs, a temperature setting unit for setting a temperature of any of said plurality of stationary discs, a comparator unit for comparing the temperature measured by the temperature sensor with the temperature set by the temperature setting unit, and an instructing unit for adjusting a flow speed of said fluid supply means based on a temperature difference obtained from the comparison by the comparator unit.

2. The kneading-mixing extruder apparatus of claim 1 further comprising:

a cylinder outer periphery temperature control device having a water passage which covers an outer periphery of said cylinder and in which the fluid may circulate.

3. The kneading-mixing extruder apparatus of claim 1 further comprising a metering device for metering the material into the receiver tank.

4. The kneading-mixing extruder apparatus of claim 1 further comprising a degassing tank for degassing the material fed from the receiver tank.

5. The kneading-mixing extruder apparatus of claim 1 wherein said first and second flow passages circulate the fluid adjusted to a temperature lower than a temperature of the material when the material passes said first and second stationary discs.

6. The kneading-mixing extruder apparatus of claim 1 wherein said first and second flow passages circulate the fluid adjusted to a temperature higher than a temperature of the material when the material passes said first and second stationary discs.

* * * * *